US012634325B2

(12) United States Patent
Zubairi et al.

(10) Patent No.: US 12,634,325 B2
(45) Date of Patent: May 19, 2026

(54) SYSTEMS, APPARATUSES, METHODS, AND COMPUTER PROGRAM PRODUCTS FOR CYBERSECURITY THREAT ASSESSMENT

(71) Applicant: HONEYWELL INTERNATIONAL INC., Charlotte, NC (US)

(72) Inventors: Khalid Hameed Zubairi, Dubai (AE); Sanil Tharayil Yogimadam, Al Wakra (QA); Muhammad Faraz Rehan, Dubai (AE)

(73) Assignee: Honeywell International Inc., Charlotte, NC (US)

( * ) Notice: Subject to any disclaimer, the term of this patent is extended or adjusted under 35 U.S.C. 154(b) by 177 days.

(21) Appl. No.: 18/474,659

(22) Filed: Sep. 26, 2023

(65) Prior Publication Data

US 2025/0106239 A1      Mar. 27, 2025

(51) Int. Cl.
*H04L 9/40* (2022.01)
(52) U.S. Cl.
CPC ...... *H04L 63/1433* (2013.01); *H04L 63/1425* (2013.01)
(58) Field of Classification Search
CPC ........................ H04L 63/1433; H04L 63/1425
See application file for complete search history.

(56) References Cited

U.S. PATENT DOCUMENTS

| | | | |
|---|---|---|---|
| 2013/0007836 A1* | 1/2013 | Stevenson | H04L 63/1425 726/1 |
| 2015/0120677 A1* | 4/2015 | Arguelles | G06F 16/248 707/687 |
| 2018/0069885 A1* | 3/2018 | Patterson | G06F 16/27 |
| 2021/0119969 A1* | 4/2021 | Lam | H04L 63/0263 |
| 2023/0290267 A1* | 9/2023 | Rosenberg | G06F 9/451 |

* cited by examiner

*Primary Examiner* — Anh Nguyen
(74) *Attorney, Agent, or Firm* — Alston & Bird LLP

(57) ABSTRACT

Systems, apparatuses, methods, and computer program products are provided herein. For example, a computer-implemented method may include receiving a cybersecurity log from a computing device. In some embodiments, the cybersecurity log is in a first format. In some embodiments, the computer-implemented method may include decoding, at least in part by applying the cybersecurity log to a decoding model, cybersecurity data. In some embodiments, the cybersecurity data is in a second format. In some embodiments, the computer-implemented method may include generating, based at least in part by applying the cybersecurity data to a cybersecurity threat rules model, a cybersecurity threat assessment of the cybersecurity log. In some embodiments, the computer-implemented method may include a cybersecurity threat interface to be displayed, wherein the cybersecurity threat interface is based at least in part on the cybersecurity threat assessment.

17 Claims, 5 Drawing Sheets

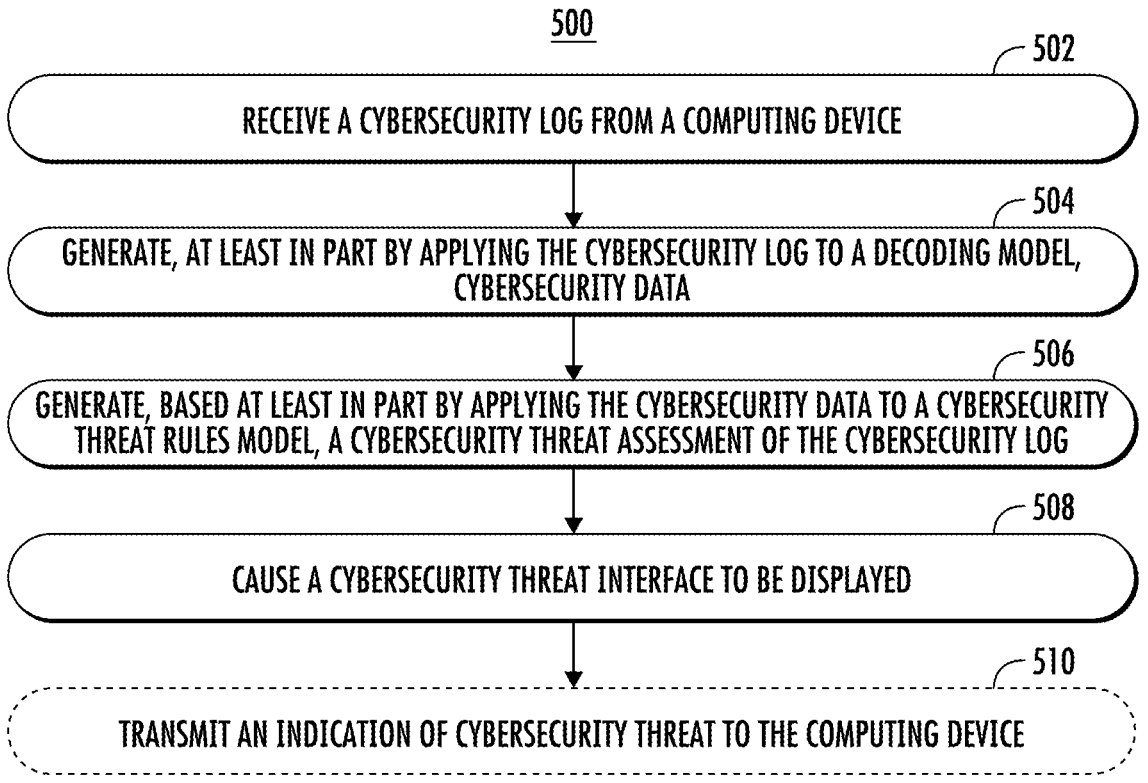

500

502
RECEIVE A CYBERSECURITY LOG FROM A COMPUTING DEVICE

504
GENERATE, AT LEAST IN PART BY APPLYING THE CYBERSECURITY LOG TO A DECODING MODEL, CYBERSECURITY DATA

506
GENERATE, BASED AT LEAST IN PART BY APPLYING THE CYBERSECURITY DATA TO A CYBERSECURITY THREAT RULES MODEL, A CYBERSECURITY THREAT ASSESSMENT OF THE CYBERSECURITY LOG

508
CAUSE A CYBERSECURITY THREAT INTERFACE TO BE DISPLAYED

510
TRANSMIT AN INDICATION OF CYBERSECURITY THREAT TO THE COMPUTING DEVICE

FIG. 5

SYSTEMS, APPARATUSES, METHODS, AND COMPUTER PROGRAM PRODUCTS FOR CYBERSECURITY THREAT ASSESSMENT

TECHNOLOGICAL FIELD

Embodiments of the present disclosure relate generally to systems, apparatuses, methods, and computer program products for cybersecurity threat assessment.

BACKGROUND

Applicant has identified many technical challenges and difficulties associated with systems, apparatuses, methods, and computer program products for cybersecurity threat assessment. Through applied effort, ingenuity, and innovation, Applicant has solved problems related to systems, apparatuses, methods, and computer program products for cybersecurity threat assessment by developing solutions embodied in the present disclosure, which are described in detail below.

BRIEF SUMMARY

Various embodiments described herein relate to systems, apparatuses, methods, and computer program products for cybersecurity threat assessment.

In accordance with one aspect of the disclosure, a computer-implemented method is provided. In some embodiments, the computer-implemented method may include receiving a cybersecurity log from a computing device. In some embodiments, the cybersecurity log is in a first format. In some embodiments, the computer-implemented method may include decoding, at least in part by applying the cybersecurity log to a decoding model, cybersecurity data. In some embodiments, the cybersecurity data is in a second format. In some embodiments, the computer-implemented method may include generating, based at least in part by applying the cybersecurity data to a cybersecurity threat rules model, a cybersecurity threat assessment of the cybersecurity log. In some embodiments, the computer-implemented method may include causing a cybersecurity threat interface to be displayed, wherein the cybersecurity threat interface is based at least in part on the cybersecurity threat assessment.

In some embodiments, the cybersecurity threat assessment indicates whether the cybersecurity log is representative of a cybersecurity threat.

In some embodiments, the computer-implemented method may include in an instance in which the cybersecurity threat assessment indicates that the cybersecurity log is representative of a cybersecurity threat, transmitting an indication of the cybersecurity threat to the computing device.

In some embodiments, the cybersecurity threat assessment indicates a type of cybersecurity threat associated with the cybersecurity log.

In some embodiments, the computing device is configured to generate the cybersecurity log by performing a cybersecurity scan on a storage medium associated with the computing device.

In some embodiments, the storage medium is a removable storage medium.

In some embodiments, wherein applying the cybersecurity log to the decoding model comprises performing a patterns field technique of the cybersecurity log.

In some embodiments, the first format is a flat log file format.

In some embodiments, the first format is a machine-readable format.

In some embodiments, the second format is a wazuh format.

In accordance with another aspect of the disclosure, an apparatus is provided. In some embodiments, the apparatus may include at least one processor and at least one non-transitory memory including computer-coded instructions thereon. In some embodiments, the computer-coded instructions, with the at least one processor, cause the apparatus to receive a cybersecurity log from a computing device. In some embodiments, the cybersecurity log is in a first format. In some embodiments, the computer-coded instructions, with the at least one processor, cause the apparatus to decode, at least in part by applying the cybersecurity log to a decoding model, cybersecurity data. In some embodiments, the cybersecurity data is in a second format. In some embodiments, the computer-coded instructions, with the at least one processor, cause the apparatus to generate, based at least in part by applying the cybersecurity data to a cybersecurity threat rules model, a cybersecurity threat assessment of the cybersecurity log. In some embodiments, the computer-coded instructions, with the at least one processor, cause the apparatus to cause a cybersecurity threat interface to be displayed, wherein the cybersecurity threat interface is based at least in part on the cybersecurity threat assessment.

In some embodiments, the cybersecurity threat assessment indicates whether the cybersecurity log is representative of a cybersecurity threat.

In some embodiments, the computer-coded instructions, with the at least one processor, cause the apparatus to, in an instance in which the cybersecurity threat assessment indicates that the cybersecurity log is representative of a cybersecurity threat, transmit an indication of the cybersecurity threat to the computing device.

In some embodiments, the cybersecurity threat assessment indicates a type of cybersecurity threat associated with the cybersecurity log.

In some embodiments, the computing device is configured to generate the cybersecurity log by performing a cybersecurity scan on a storage medium associated with the computing device.

In some embodiments, the storage medium is a removable storage medium.

In some embodiments, wherein applying the cybersecurity log to the decoding model comprises performing a patterns field technique of the cybersecurity log.

In some embodiments, the first format is a flat log file format.

In some embodiments, the first format is a machine-readable format.

In some embodiments, the second format is a wazuh format.

In accordance with another aspect of the disclosure, a computer program product is provided. In some embodiments, the computer program product includes at least one non-transitory computer-readable storage medium having computer program code stored thereon. In some embodiments, the computer program code, in execution with at least one processor, configures the computer program product receiving a cybersecurity log from a computing device. In some embodiments, the cybersecurity log is in a first format. In some embodiments, the computer program code, in execution with at least one processor, configures the computer program product decoding, at least in part by applying the cybersecurity log to a decoding model, cybersecurity data. In some embodiments, the cybersecurity data is in a second format. In some embodiments, the computer program code, in execution with at least one processor, configures the computer program product generating, based at least in part by applying the cybersecurity data to a cybersecurity threat rules model, a cybersecurity threat assessment of the cybersecurity log. In some embodiments, the computer program code, in execution with at least one processor, configures the computer program product causing a cybersecurity threat interface to be displayed, wherein the cybersecurity threat interface is based at least in part on the cybersecurity threat assessment.

In some embodiments, the cybersecurity threat assessment indicates whether the cybersecurity log is representative of a cybersecurity threat.

In some embodiments, the computer program code, in execution with at least one processor, configures the computer program product in an instance in which the cybersecurity threat assessment indicates that the cybersecurity log is representative of a cybersecurity threat, transmitting an indication of the cybersecurity threat to the computing device.

In some embodiments, the cybersecurity threat assessment indicates a type of cybersecurity threat associated with the cybersecurity log.

In some embodiments, the computing device is configured to generate the cybersecurity log by performing a cybersecurity scan on a storage medium associated with the computing device.

In some embodiments, the storage medium is a removable storage medium.

In some embodiments, wherein applying the cybersecurity log to the decoding model comprises performing a patterns field technique of the cybersecurity log.

In some embodiments, the first format is a flat log file format.

In some embodiments, the first format is a machine-readable format.

In some embodiments, the second format is a wazuh format.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 5 illustrates a flowchart of an example method in accordance with one or more embodiments of the present disclosure.

DETAILED DESCRIPTION

Figure 1:
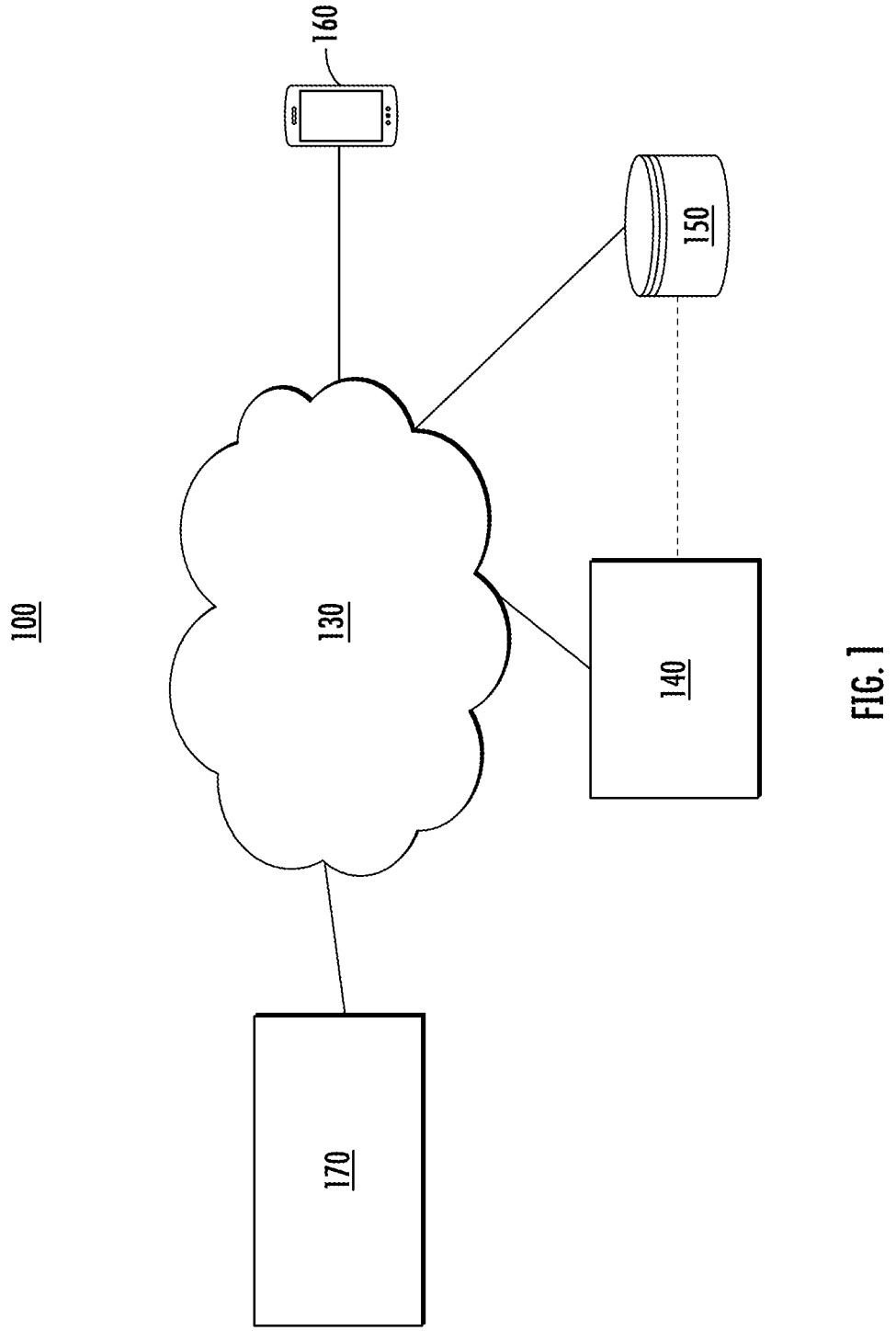
FIG. 1 illustrates an exemplary block diagram of an environment in which embodiments of the present disclosure may operate.

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of a system, or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively, or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

Overview

Example embodiments disclosed herein address technical problems associated with systems, apparatuses, methods, and computer program products for cybersecurity threat assessment. As would be understood by one skilled in the field to which this disclosure pertains, there are numerous example scenarios in which a user may use systems, apparatuses, methods, and computer program products for cybersecurity threat assessment.

In many applications, systems, apparatuses, methods, and computer program products for cybersecurity threat assessment are desirable. For example, it may be desirable to use systems, apparatuses, methods, and computer program products for cybersecurity threat assessment to generate a cybersecurity threat assessment that identifies cybersecurity threats associated with a computing device and/or a storage medium (e.g., a removable storage medium such as a USB).

Example solutions for generating a cybersecurity threat assessment that identifies cybersecurity threats associated with a computing device and/or a storage medium include, for example, analyzing cybersecurity logs associated with the computing device and/or the storage medium (e.g., logs associated with the operations of the computing device and/or the storage medium). However, cybersecurity logs associated with many computing devices and/or storage mediums may be in a format that makes it is impractical or impossible to generate a cybersecurity threat assessment based on the cybersecurity logs. For example, in such example solutions, it is not possible to generate a comprehensive cybersecurity threat assessment from the cybersecurity logs and/or transform the cybersecurity logs into another format from which a comprehensive cybersecurity threat assessment can be generated. Accordingly, there is a need for systems, apparatuses, methods, and computer program products for cybersecurity threat assessment that are capable of generating a comprehensive cybersecurity threat assessment based on cybersecurity logs.

Thus, to address these and/or other issues related to systems, apparatuses, methods, and computer program products for cybersecurity threat assessment, example systems, apparatuses, methods, and computer program product for cybersecurity threat assessment are disclosed herein. For example, an embodiment in this disclosure, described in greater detail below, includes a computer-implemented method that includes receiving a cybersecurity log from a computing device. In some embodiments, the cybersecurity log is in a first format. In some embodiments, the computer-implemented method may include decoding, at least in part by applying the cybersecurity log to a decoding model, cybersecurity data. In some embodiments, the cybersecurity data is in a second format. In some embodiments, the computer-implemented method may include generating, based at least in part by applying the cybersecurity data to a cybersecurity threat rules model, a cybersecurity threat assessment of the cybersecurity log. In some embodiments, the computer-implemented method may include causing a cybersecurity threat interface to be displayed, wherein the cybersecurity threat interface is based at least in part on the cybersecurity threat assessment.

Example Systems and Apparatuses

Embodiments of the present disclosure herein include systems, apparatuses, methods, and computer program products related to systems, apparatuses, methods, and computer program products for cybersecurity threat assessment. It should be readily appreciated that the embodiments of the systems, apparatuses, methods, and computer program product described herein may be configured in various additional and alternative manners in addition to those expressly described herein.

FIG. 1 illustrates an exemplary block diagram of an environment 100 in which embodiments of the present disclosure may operate. Specifically, FIG. 1 illustrates a computing device 170. In some embodiments, the computing device 170 may be configured via hardware, software, firmware, and/or a combination thereof, to perform data intake, data processing, data output, and/or other data process(es) associated with performing one or more computing operations described herein. Although the environment 100 illustrated in FIG. 1 includes one computing device, it would be understood by one skilled in the field to which this disclosure pertains that the environment 100 may include more than one computing device. For example, the environment 100 may include two computing devices.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

In some embodiments, the environment 100 may include a cybersecurity threat assessment system 140. The cybersecurity threat assessment system 140 may be electronically and/or communicatively coupled to the computing device 170, one or more user devices 160, and/or the one or more databases 150. The cybersecurity threat assessment system 140 may be located remotely, in proximity of, and/or within the computing device 170. In some embodiments, the cybersecurity threat assessment system 140 is configured via hardware, software, firmware, and/or a combination thereof, to perform data intake of one or more types of data associated with the computing device 170. Additionally, or alternatively, in some embodiments, the cybersecurity threat assessment system 140 is configured via hardware, software, firmware, and/or a combination thereof, to generate and/or transmit command(s) that control, adjust, or otherwise impact operations of one or more of the one or more databases 150 and/or the computing device 170. Additionally, or alternatively still, in some embodiments, the cybersecurity threat assessment system 140 is configured via hardware, software, firmware, and/or a combination thereof, to perform data reporting and/or other data output process (es) associated with monitoring or otherwise analyzing operations of one or more of the one or more databases 150 and/or the computing device 170, for example for generating and/or outputting report(s) corresponding to the operations performed via and/or by the computing device 170. For example, in various embodiments, the cybersecurity threat assessment system 140 may be configured to execute and/or perform one or more operations and/or functions described herein.

The one or more databases 150 may be configured to receive, store, and/or transmit data. In some embodiments, the one or more databases 150 may be associated with one or more datasets associated with the cybersecurity threat assessment system 140 and/or the computing device 170. In some embodiments, the one or more databases 150 may be associated with datasets received and/or generated by the cybersecurity threat assessment system 140 in real-time. Additionally, or alternatively, the one or more databases 150 may be associated with datasets received and/or generated by the cybersecurity threat assessment system 140 on a periodic basis (e.g., the datasets may be received and/or generated by the cybersecurity threat assessment system 140 once per day). Additionally, or alternatively, the one or more databases 150 may be associated with datasets received by the cybersecurity threat assessment system 140 after the cybersecurity threat assessment system 140 has requested the datasets. Additionally, or alternatively, the one or more databases 150 may be associated with datasets based on an input (e.g., a user input) into the cybersecurity threat assessment system 140 and/or the one or more user devices 160.

The one or more user devices 160 may be associated with users of cybersecurity threat assessment system 140. In various embodiments, the cybersecurity threat assessment system 140 may generate and/or transmit a message, alert, or indication to a user via one or more user devices 160. Additionally, or alternatively, the one or more user devices 160 may be utilized by a user to remotely access the cybersecurity threat assessment system 140. This may be by, for example, an application operating on the one or more user devices 160. A user may access the cybersecurity threat assessment system 140 remotely, including one or more visualizations, reports, and/or real-time displays.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the cybersecurity threat assessment system 140 may include one or more databases 150, which may collectively be located in or at the computing device 170 (e.g., the cybersecurity threat assessment system 140 and/or the computing device 170 may be combined into one or more components).

Figure 2:
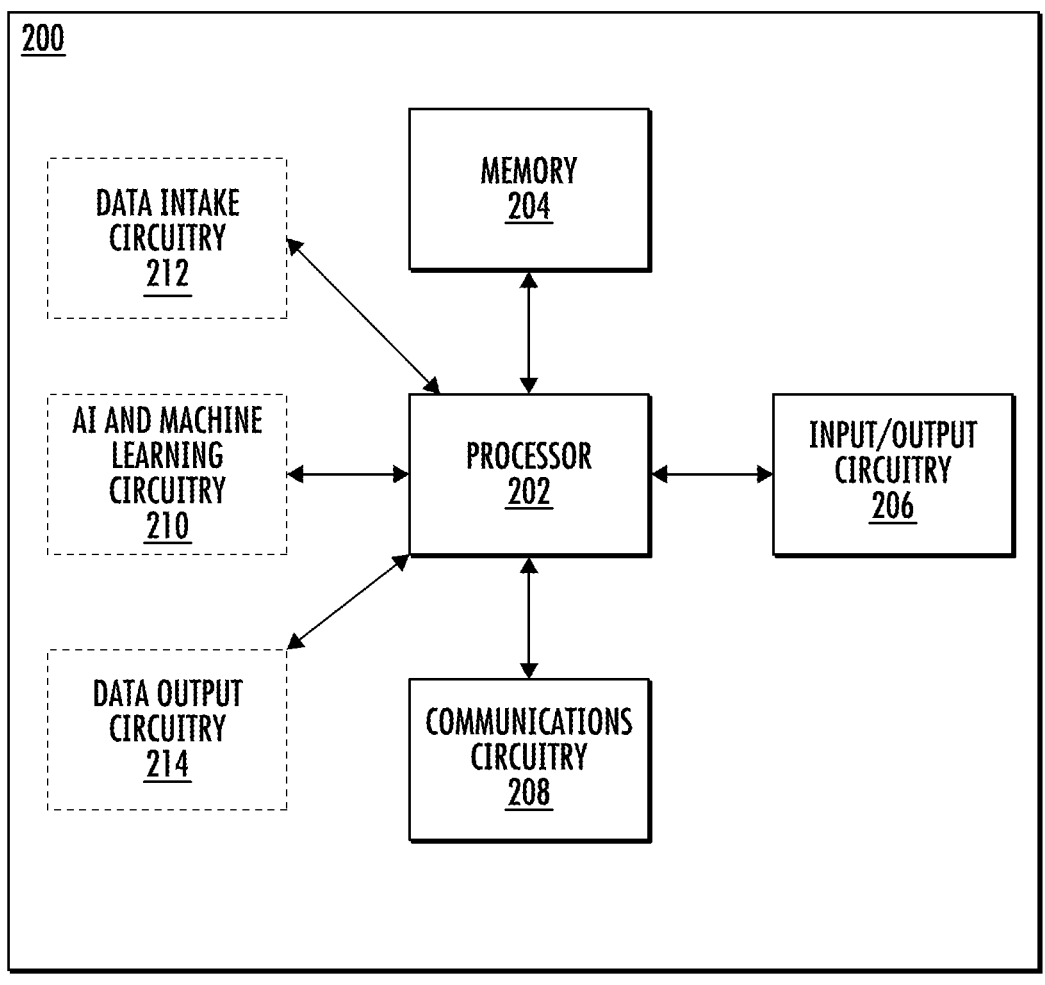
FIG. 2 illustrates an exemplary block diagram of an example apparatus that may be specially configured in accordance with an example embodiment of the present disclosure.
Figure 3:
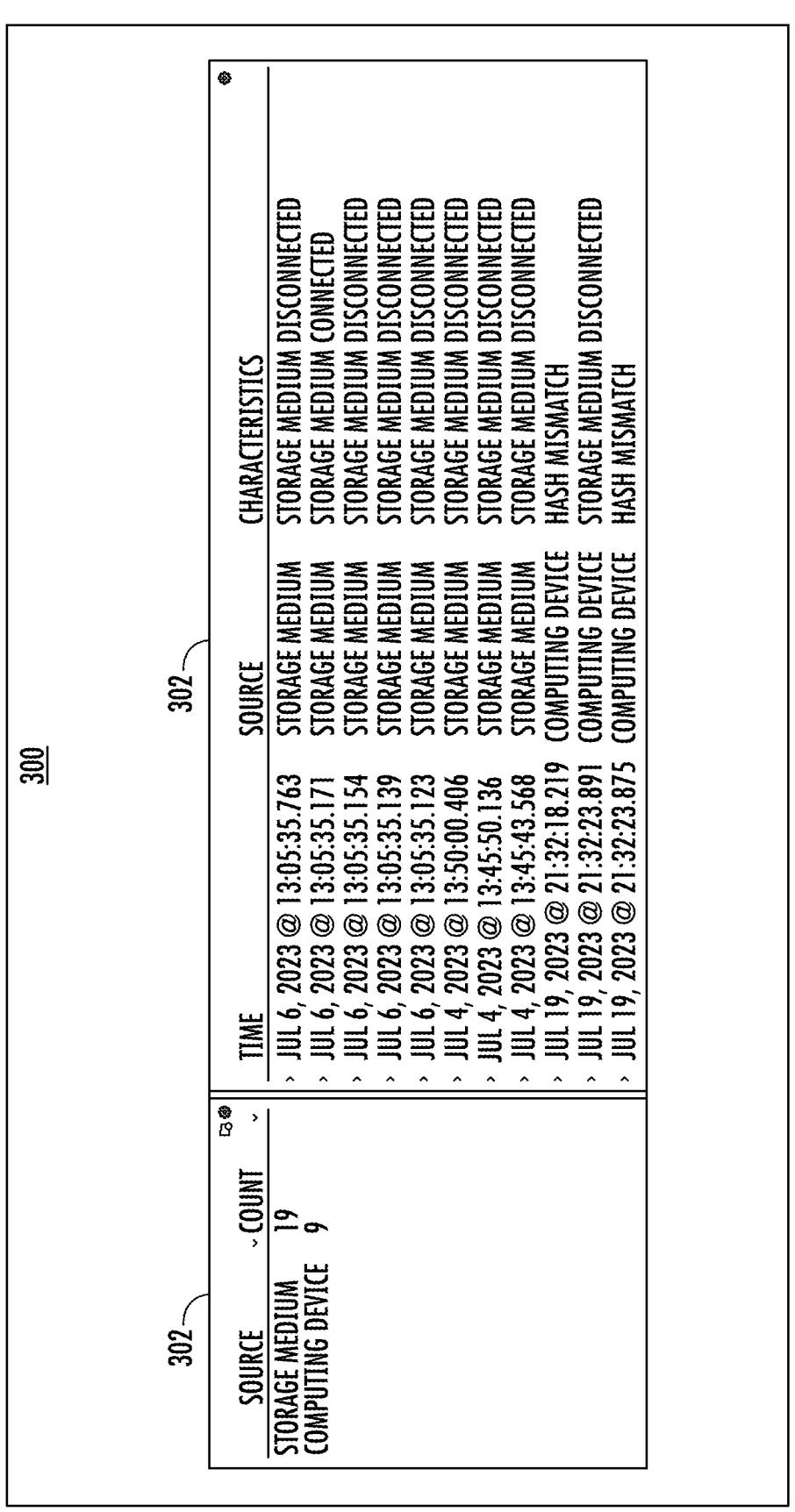
FIG. 3 illustrates an example cybersecurity threat interface in accordance with one or more embodiments of the present disclosure.
Figure 4:
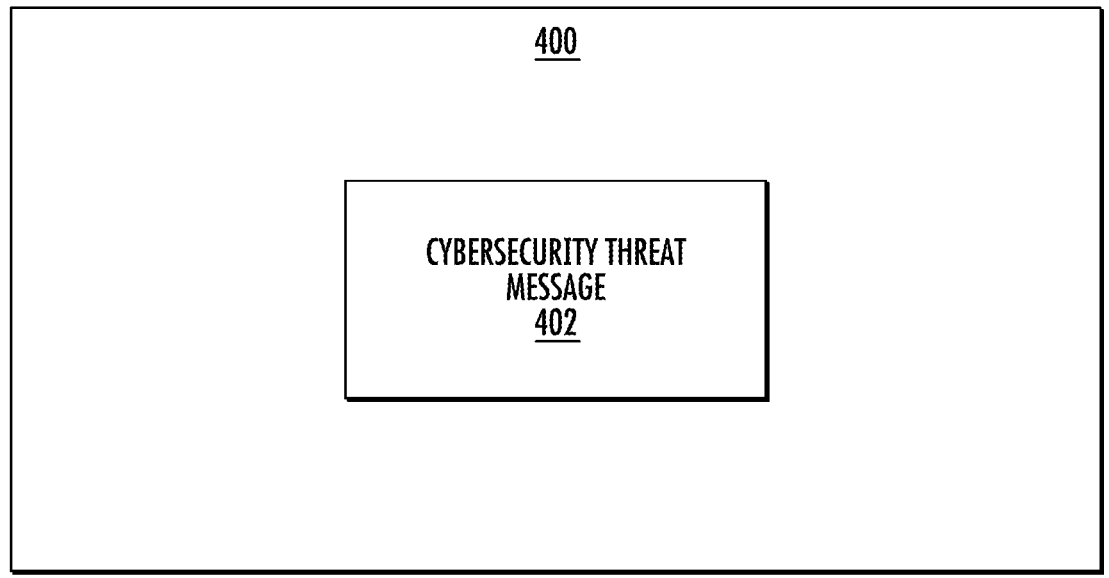
FIG. 4 illustrates an example cybersecurity threat message interface in accordance with one or more embodiments of the present disclosure.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. For example, the computing apparatus 200 may be embodied as one or more of a specifically configured personal computing apparatus, a specifically configured cloud-based computing apparatus, and/or the like. Examples of an apparatus 200 may include, but is not limited to, the cybersecurity threat assessment system 140, the computing device 170, the one or more user devices 160, and/or the one or more databases 150. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as computing apparatus 200 of a cybersecurity threat assessment system 140, the computing device 170, and/or the one or more user devices 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally, or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data. In some embodiments, the data intake circuitry 212 includes hardware, software, firmware, and/or a combination thereof, that communicates with one or more components of the cybersecurity threat assessment system 140, the computing device 170, the one or more user devices 160, and/or the one or more databases 150 to receive particular data. Additionally, or alternatively, in some embodiments, the data intake circuitry 212 includes hardware, software, firmware, and/or a combination thereof, that retrieves particular data associated with the cybersecurity threat assessment system 140, the computing device 170, the one or more user devices 160, and/or the one or more databases 150 from one or more data repository/repositories accessible to the apparatus 200.

AI and machine learning circuitry 210 may be included in the apparatus 200. The AI and machine learning circuitry 210 may include hardware, software, firmware, and/or a combination thereof designed and/or configured to request, receive, process, generate, and transmit data, datasets, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data (e.g., a natural language processing machine learning model). Additionally, or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally, or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally, or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally, or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-4, the cybersecurity threat assessment system 140 may be configured to receive a cybersecurity log from the computing device 170. Additionally, or alternatively, the cybersecurity threat assessment system 140 may be configured to identify a cybersecurity log. In some embodiments, the cybersecurity log may include data about one or more operations performed by the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140. For example, the cybersecurity log may include data about one or more operations related to cybersecurity performed by the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140. Additionally, or alternatively, the cybersecurity log may include metadata associated with the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140.

In some embodiments, the cybersecurity log may be in a first format. For example, the first format may be a flat log format. Additionally, or alternatively, for example, the first format may be a machine-readable format. In this regard, for example, the first format may be a format that may be readable by a machine (e.g., the computing device 170 and/or the cybersecurity threat assessment system 140) and/or a format other than a human readable format.

In some embodiments, the computing device 170 and/or the cybersecurity threat assessment system 140 may be configured to generate the cybersecurity log. In some embodiments, the computing device 170 and/or the cybersecurity threat assessment system 140 may be configured to generate the cybersecurity log by performing a cybersecurity scan. In this regard, for example, the computing device 170 and/or the cybersecurity threat assessment system 140 may be configured to perform a cybersecurity scan on the computing device 170. As another example, the computing device 170 and/or the cybersecurity threat assessment system 140 may be configured to perform a cybersecurity scan on another computing device (e.g., another computing device associated with the computing device 170 and/or the cybersecurity threat assessment system 140). As another example, the computing device 170 and/or the cybersecurity threat assessment system 140 may be configured to perform a cybersecurity scan on a storage medium (e.g., a storage medium associated with the computing device 170 and/or the cybersecurity threat assessment system 140). In this regard, for example, the computing device 170 and/or the cybersecurity threat assessment system 140 may be configured to perform a cybersecurity scan on a removable storage medium (e.g., a USB). As another example, the computing device 170 and/or the cybersecurity threat assessment system 140 may be configured to perform a cybersecurity scan on the cybersecurity threat assessment system 140.

In some embodiments, the computing device 170 and/or the cybersecurity threat assessment system 140 may be configured to generate cybersecurity data. In some embodiments, the computing device 170 and/or the cybersecurity threat assessment system 140 may be configured to generate the cybersecurity data at least in part by applying the cybersecurity log to a decoding model. In some embodiments, the decoding model may comprise one or more of a statistical model, an algorithmic model, and/or a machine learning model (e.g., using AI and machine learning circuitry 210 to perform supervised and/or unsupervised machine learning) configured to at least in part generate the cybersecurity data.

In some embodiments, applying the cybersecurity log to the decoding model to generate the cybersecurity data may include performing a patterns field technique on the cybersecurity log. For example, the decoding model may be configured to perform a patterns field technique on the cybersecurity log. In this regard, for example, the decoding model may be configured to parse the cybersecurity log to extract data about one or more operations performed by the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140. Additionally, or alternatively, the decoding model may be configured to parse the cybersecurity log to extract metadata associated with the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140. For example, the decoding model may be configured to parse the cybersecurity log to extract metadata such as manufacturer identification, product identification, serial number, configuration descriptor, device name, and/or the like.

In some embodiments, applying the cybersecurity log to the decoding model may include transforming the extracted data about one or more operations performed by the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140 into a second format (e.g., from the first format to the second format). Additionally, or alternatively, applying the cybersecurity log to the decoding model may include transforming the extracted metadata about the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140 into the second format. For example, the decoding model may be configured to transform metadata such as manufacturer identification, product identification, serial number, configuration descriptor, device name, and/or the like into the second format. Said differently, the cybersecurity data may be representative of the data and/or metadata from the cybersecurity log in the second format. In some embodiments, the second format may be a wazuh format. Additionally, or alternatively, the second format may be a machine-readable format and/or a human readable format.

In some embodiments, the cybersecurity threat assessment system 140 may be configured to generate a cyberse-curity threat assessment of the cybersecurity log. In some embodiments, the cybersecurity threat assessment system 140 may be configured to generate the cybersecurity threat assessment of the cybersecurity log based at least in part by applying the cybersecurity data to a cybersecurity threat rules model. In this regard, the cybersecurity threat rules model may comprise one or more of a statistical model, an algorithmic model, and/or a machine learning model (e.g., using AI and machine learning circuitry 210 to perform supervised and/or unsupervised machine learning) config-ured to at least in part generate the cybersecurity threat assessment.

In some embodiments, applying the cybersecurity data to the cybersecurity threat rules model may include the cyber-security threat rules model parsing the cybersecurity data to identify one or more characteristics of the cybersecurity log. For example, the cybersecurity threat rules model may be configured to identify whether the cybersecurity log is indicative of a storage medium being rejected (e.g., a removable storage medium being rejected by the computing device 170). As another example, the cybersecurity threat rules model may be configured to identify whether the cybersecurity log is indicative of a storage medium being connected (e.g., a removable storage medium being con-nected to the computing device 170). As another example, the cybersecurity threat rules model may be configured to identify whether the cybersecurity log is indicative of a storage medium being disconnected (e.g., a removable stor-age medium being disconnected from the computing device 170), an invalid manifest (e.g., an invalid manifest associ-ated with the computing device 170). As another example, the cybersecurity threat rules model may be configured to identify whether the cybersecurity log is indicative of an unverifiable manifest. As another example, the cybersecurity threat rules model may be configured to identify whether the cybersecurity log is indicative of an unavailable manifest. As another example, the cybersecurity threat rules model may be configured to identify whether the cybersecurity log is indicative of a hash mismatch. Said differently, for example, generating the cybersecurity threat assessment may include the cybersecurity threat assessment system 140 applying the cybersecurity data to the cybersecurity threat rules model to determine one or more characteristics of the cybersecurity log. In this regard, for example, the cyberse-curity threat assessment may be based at least in part on the one or more characteristics of the cybersecurity log.

In some embodiments, the cybersecurity threat assessment may indicate whether the cybersecurity log is repre-sentative of a cybersecurity threat. For example, the cyber-security threat assessment may indicate that there is a cybersecurity threat associated with the computing device 170, another computing device (e.g., another computing device associated with the computing device 170 and/or the cybersecurity threat assessment system 140), a storage medium (e.g., a storage medium associated with the com-puting device 170 and/or the cybersecurity threat assessment system 140) and/or the cybersecurity threat assessment system 140. As another example, the cybersecurity threat assessment may indicate that there is not a cybersecurity threat associated with the computing device 170, another computing device (e.g., another computing device associ-ated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140.

In some embodiments, the cybersecurity threat assess-ment may indicate a type of cybersecurity threat associated with the cybersecurity log. For example, the cybersecurity threat assessment may indicate a type of cybersecurity threat associated with a cybersecurity log associated with the computing device 170, another computing device (e.g., another computing device associated with the computing device 170 and/or the cybersecurity threat assessment sys-tem 140), a storage medium (e.g., a storage medium asso-ciated with the computing device 170 and/or the cyberse-curity threat assessment system 140) and/or the cybersecurity threat assessment system 140. In some embodiments, the type of cybersecurity threat may be one or more of malware, spyware, ransomware, and/or the like.

In some embodiments, the cybersecurity threat assess-ment system 140 may be configured to cause a cybersecurity threat interface 300 to be displayed. In this regard, for example, the cybersecurity threat assessment system 140 may be configured to cause the cybersecurity threat interface 300 to be displayed on an interface associated with the computing device 170, another computing device (e.g., another computing device associated with the computing device 170 and/or the cybersecurity threat assessment sys-tem 140), a storage medium (e.g., a storage medium asso-ciated with the computing device 170 and/or the cyberse-curity threat assessment system 140) and/or the cybersecurity threat assessment system 140. In some embodiments, the cybersecurity threat interface 300 may be based at least in part on the cybersecurity threat assessment. Said differently, for example, the cybersecurity threat inter-face 300 may be configured to display at least a portion of the cybersecurity threat assessment.

In some embodiments, the cybersecurity threat interface 300 may include a source component 302. In some embodi-ments, the source component 302 may be configured to display sources for which the cybersecurity threat assess-ment system 140 has identified cybersecurity threats. For example, sources may include the computing device 170, another computing device (e.g., another computing device associated with the computing device 170 and/or the cyber-security threat assessment system 140), a storage medium (e.g., a storage medium associated with the computing device 170 and/or the cybersecurity threat assessment sys-tem 140) and/or the cybersecurity threat assessment system 140. Additionally, or alternatively, the source component 302 may be configured to display a count of cybersecurity threats that the cybersecurity threat assessment system 140 has identified for each source. For example, the source component 302 may be configured to display that the cybersecurity threat assessment system 140 has identified 19 cybersecurity threats for a storage medium.

In some embodiments, the cybersecurity threat interface 300 may include a characteristics identification component 304. In some embodiments, the characteristics identification component 304 may be configured to display characteristics of cybersecurity logs identified by the cybersecurity threat assessment system 140, the source associated with the cybersecurity log, and/or the data and time at which the characteristic was identified. For example, the characteristics identification component 304 may be configured to display a hash mismatch associated with a cybersecurity log associated with the computing device 170.

In some embodiments, the cybersecurity threat assessment system 140 may be configured to transmit an indication of an identified cybersecurity threat to the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140. For example, the cybersecurity threat assessment system 140 may be configured to transmit an indication of an identified cybersecurity threat in an instance in which the cybersecurity threat assessment indicates that a cybersecurity log is representative of a cybersecurity threat.

In some embodiments, the indication of the cybersecurity threat may be configured to cause a cybersecurity threat message 402 to be displayed on a cybersecurity threat message interface 400 associated with the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140. In some embodiments, the cybersecurity threat message 402 may be configured to inform a user associated with the computing device 170, another computing device (e.g., another computing device associated with the computing device 170 and/or the cybersecurity threat assessment system 140), a storage medium (e.g., a storage medium associated with the computing device 170 and/or the cybersecurity threat assessment system 140) and/or the cybersecurity threat assessment system 140 that a cybersecurity threat has been identified.

Example Methods

Referring now to FIG. 5, a flowchart providing an example method 500 is illustrated. In this regard, FIG. 5 illustrates operations that may be performed by the cybersecurity threat assessment system 140, the user device 160, the computing device 170, and/or the like. In some embodiments, the example method 500 defines a computer-implemented process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 500.

As shown in block 502, the method 500 may include receiving a cybersecurity log from a computing device. As described above, additionally, or alternatively, the cybersecurity threat assessment system may be configured to identify a cybersecurity log. In some embodiments, the cybersecurity log may include data about one or more operations performed by the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. For example, the cybersecurity log may include data about one or more operations related to cybersecurity performed by the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. Additionally, or alternatively, the cybersecurity log may include metadata associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system.

In some embodiments, the cybersecurity log may be in a first format. For example, the first format may be a flat log format. Additionally, or alternatively, for example, the first format may be a machine-readable format. In this regard, for example, the first format may be a format that may be readable by a machine (e.g., the computing device and/or the cybersecurity threat assessment system) and/or a format other than a human readable format.

In some embodiments, the computing device and/or the cybersecurity threat assessment system may be configured to generate the cybersecurity log. In some embodiments, the computing device and/or the cybersecurity threat assessment system may be configured to generate the cybersecurity log by performing a cybersecurity scan. In this regard, for example, the computing device and/or the cybersecurity threat assessment system may be configured to perform a cybersecurity scan on the computing device. As another example, the computing device and/or the cybersecurity threat assessment system may be configured to perform a cybersecurity scan on another computing device (e.g., another computing device associated with the computing device and/or the cybersecurity threat assessment system). As another example, the computing device and/or the cybersecurity threat assessment system may be configured to perform a cybersecurity scan on a storage medium (e.g., a storage medium associated with the computing device and/or the cybersecurity threat assessment system). In this regard, for example, the computing device and/or the cybersecurity threat assessment system may be configured to perform a cybersecurity scan on a removable storage medium (e.g., a USB). As another example, the computing device and/or the cybersecurity threat assessment system may be configured to perform a cybersecurity scan on the cybersecurity threat assessment system.

As shown in block 504, the method 500 may include generating, at least in part by applying the cybersecurity log to a decoding model, cybersecurity data. As described above, in some embodiments, the decoding model may comprise one or more of a statistical model, an algorithmic model, and/or a machine learning model (e.g., using AI and machine learning circuitry to perform supervised and/or unsupervised machine learning) configured to at least in part generate the cybersecurity data.

In some embodiments, applying the cybersecurity log to the decoding model to generate the cybersecurity data may include performing a patterns field technique on the cybersecurity log. For example, the decoding model may be configured to perform a patterns field technique on the cybersecurity log. In this regard, for example, the decoding model may be configured to parse the cybersecurity log to extract data about one or more operations performed by the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. Additionally, or alternatively, the decoding model may be configured to parse the cybersecurity log to extract metadata associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. For example, the decoding model may be configured to parse the cybersecurity log to extract metadata such as manufacturer identification, product identification, serial number, configuration descriptor, device name, and/or the like.

In some embodiments, applying the cybersecurity log to the decoding model may include transforming the extracted data about one or more operations performed by the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system into a second format (e.g., from the first format to the second format). Additionally, or alternatively, applying the cybersecurity log to the decoding model may include transforming the extracted metadata about the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system into the second format. For example, the decoding model may be configured to transform metadata such as manufacturer identification, product identification, serial number, configuration descriptor, device name, and/or the like into the second format. Said differently, the cybersecurity data may be representative of the data and/or metadata from the cybersecurity log in the second format. In some embodiments, the second format may be a wazuh format. Additionally, or alternatively, the second format may be a machine-readable format and/or a human readable format.

As shown in block 506, the method 500 may include generating, based at least in part by applying the cybersecurity data to a cybersecurity threat rules model, a cybersecurity threat assessment of the cybersecurity log. As described above, in some embodiments, the cybersecurity threat rules model may comprise one or more of a statistical model, an algorithmic model, and/or a machine learning model (e.g., using AI and machine learning circuitry to perform supervised and/or unsupervised machine learning) configured to at least in part generate the cybersecurity threat assessment.

In some embodiments, applying the cybersecurity data to the cybersecurity threat rules model may include the cybersecurity threat rules model parsing the cybersecurity data to identify one or more characteristics of the cybersecurity log. For example, the cybersecurity threat rules model may be configured to identify whether the cybersecurity log is indicative of a storage medium being rejected (e.g., a removable storage medium being rejected by the computing device). As another example, the cybersecurity threat rules model may be configured to identify whether the cybersecurity log is indicative of a storage medium being connected (e.g., a removable storage medium being connected to the computing device). As another example, the cybersecurity threat rules model may be configured to identify whether the cybersecurity log is indicative of a storage medium being disconnected (e.g., a removable storage medium being disconnected from the computing device), an invalid manifest (e.g., an invalid manifest associated with the computing device). As another example, the cybersecurity threat rules model may be configured to identify whether the cybersecurity log is indicative of an unverifiable manifest. As another example, the cybersecurity threat rules model may be configured to identify whether the cybersecurity log is indicative of an unavailable manifest. As another example, the cybersecurity threat rules model may be configured to identify whether the cybersecurity log is indicative of a hash mismatch. Said differently, for example, generating the cybersecurity threat assessment may include the cybersecurity threat assessment system applying the cybersecurity data to the cybersecurity threat rules model to determine one or more characteristics of the cybersecurity log. In this regard, for example, the cybersecurity threat assessment may be based at least in part on the one or more characteristics of the cybersecurity log.

In some embodiments, the cybersecurity threat assessment may indicate whether the cybersecurity log is representative of a cybersecurity threat. For example, the cybersecurity threat assessment may indicate that there is a cybersecurity threat associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. As another example, the cybersecurity threat assessment may indicate that there is not a cybersecurity threat associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system.

In some embodiments, the cybersecurity threat assessment may indicate a type of cybersecurity threat associated with the cybersecurity log. For example, the cybersecurity threat assessment may indicate a type of cybersecurity threat associated with a cybersecurity log associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. In some embodiments, the type of cybersecurity threat may be one or more of malware, spyware, ransomware, and/or the like.

As shown in block 508, the method 500 may include causing a cybersecurity threat interface to be displayed. As described above, in some embodiments, the cybersecurity threat assessment system may be configured to cause the cybersecurity threat interface to be displayed on an interface associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. In some embodiments, the cybersecurity threat interface may be based at least in part on the cybersecurity threat assessment. Said differently, for example, the cybersecurity threat interface may be configured to display at least a portion of the cybersecurity threat assessment.

In some embodiments, the cybersecurity threat interface may include a source component. In some embodiments, the source component may be configured to display sources for which the cybersecurity threat assessment system has identified cybersecurity threats. For example, sources may include the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. Additionally, or alternatively, the source component may be configured to display a count of cybersecurity threats that the cybersecurity threat assessment system has identified for each source. For example, the source component may be configured to display that the cybersecurity threat assessment system has identified 19 cybersecurity threats for a storage medium.

In some embodiments, the cybersecurity threat interface may include a characteristics identification component. In some embodiments, the characteristics identification component may be configured to display characteristics of cybersecurity logs identified by the cybersecurity threat assessment system, the source associated with the cybersecurity log, and/or the data and time at which the characteristic was identified. For example, the characteristics identification component may be configured to display a hash mismatch associated with a cybersecurity log associated with the computing device.

As shown in block 510, the method 500 may optionally include, in an instance in which the cybersecurity threat assessment indicates that the cybersecurity log is representative of a cybersecurity threat, transmitting an indication of the cybersecurity threat to the computing device. As described above, in some embodiments, the cybersecurity threat assessment system may be configured to transmit an indication of an identified cybersecurity threat to the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. For example, the cybersecurity threat assessment system may be configured to transmit an indication of an identified cybersecurity threat in an instance in which the cybersecurity threat assessment indicates that a cybersecurity log is representative of a cybersecurity threat.

In some embodiments, the indication of the cybersecurity threat may be configured to cause a cybersecurity threat message to be displayed on a cybersecurity threat message interface associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system. In some embodiments, the cybersecurity threat message may be configured to inform a user associated with the computing device, another computing device (e.g., another computing device associated with the computing device and/or the cybersecurity threat assessment system), a storage medium (e.g., a storage medium associated with the computing device and/or the cybersecurity threat assessment system) and/or the cybersecurity threat assessment system that a cybersecurity threat has been identified.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results.

Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

That which is claimed:

1. A computer-implemented method comprising:
receiving a cybersecurity log from a computing device, wherein the cybersecurity log is in a first format, wherein the cybersecurity log comprises data about one or more operations performed by at least the computing device and metadata associated with at least the computing device, and wherein the metadata comprises one or more of a serial number, configuration descriptor, or device name;
decoding, at least in part by applying the cybersecurity log to a decoding model, cybersecurity data, wherein the cybersecurity data is in a second format, and wherein applying the cybersecurity log to the decoding model comprises performing a patterns field technique of the cybersecurity log;
generating, based at least in part by applying the cybersecurity data to a cybersecurity threat rules model, a cybersecurity threat assessment of the cybersecurity log, wherein the cybersecurity threat rules model is configured to at least identify whether the cybersecurity log is indicative of a storage medium being rejected by the computing device or being connected to the computing device; and
causing a cybersecurity threat interface to be displayed, wherein the cybersecurity threat interface is based at least in part on the cybersecurity threat assessment, wherein the cybersecurity threat interface comprises a source component and a characteristics identification component.

2. The computer-implemented method of claim 1, wherein the cybersecurity threat assessment indicates whether the cybersecurity log is representative of a cybersecurity threat.

3. The computer-implemented method of claim 2, further comprising:
in an instance in which the cybersecurity threat assessment indicates that the cybersecurity log is representative of a cybersecurity threat, transmitting an indication of the cybersecurity threat to the computing device.

4. The computer-implemented method of claim 1, wherein the cybersecurity threat assessment indicates a type of cybersecurity threat associated with the cybersecurity log.

5. The computer-implemented method of claim 1, wherein the computing device is configured to generate the cybersecurity log by performing a cybersecurity scan on a storage medium associated with the computing device.

6. The computer-implemented method of claim 5, wherein the storage medium is a removable storage medium.

7. The computer-implemented method of claim 1, wherein the first format is a flat log file format.

8. The computer-implemented method of claim 1, wherein the second format is a wazuh format.

9. An apparatus comprising at least one processor and at least one non-transitory memory including computer-coded instructions thereon, the computer-coded instructions, with the at least one processor, cause the apparatus to:
receive a cybersecurity log from a computing device, wherein the cybersecurity log is in a first format, wherein the cybersecurity log comprises data about one or more operations performed by at least the computing device and metadata associated with at least the computing device, and wherein the metadata comprises one or more of a serial number, configuration descriptor, or device name;
generate, at least in part by applying the cybersecurity log to a decoding model, cybersecurity data, wherein the cybersecurity data is in a second format, and wherein applying the cybersecurity log to the decoding model comprises performing a patterns field technique of the cybersecurity log;
generate, based at least in part by applying the cybersecurity data to a cybersecurity threat rules model, a cybersecurity threat assessment of the cybersecurity log, wherein the cybersecurity threat rules model is configured to at least identify whether the cybersecurity log is indicative of a storage medium being rejected by the computing device or being connected to the computing device; and
cause a cybersecurity threat interface to be displayed, wherein the cybersecurity threat interface is based at least in part on the cybersecurity threat assessment, wherein the cybersecurity threat interface comprises a source component and a characteristics identification component.

10. The apparatus of claim 9, wherein the cybersecurity threat assessment indicates whether the cybersecurity log is representative of a cybersecurity threat.

11. The apparatus of claim 10, wherein the computer-coded instructions, further with the at least one processor, cause the apparatus to:
in an instance in which the cybersecurity threat assessment indicates that the cybersecurity log is representative of a cybersecurity threat, transmitting an indication of the cybersecurity threat to the computing device.

12. The apparatus of claim 9, wherein the cybersecurity threat assessment indicates a type of cybersecurity threat associated with the cybersecurity log.

13. The apparatus of claim 9, wherein the computing device is configured to generate the cybersecurity log by performing a cybersecurity scan on a storage medium associated with the computing device.

14. The apparatus of claim 13, wherein the storage medium is a removable storage medium.

15. The apparatus of claim 9, wherein the first format is a flat log file format.

16. The apparatus of claim 9, wherein the second format is a wazuh format.

17. A computer program product comprising at least one non-transitory computer-readable storage medium having computer program code stored thereon that, in execution with at least one processor, configures the computer program product for:

receiving a cybersecurity log from a computing device, wherein the cybersecurity log is in a first format, wherein the cybersecurity log comprises data about one or more operations performed by at least the computing device and metadata associated with at least the computing device, and wherein the metadata comprises one or more of a serial number, configuration descriptor, or device name;

decoding, at least in part by applying the cybersecurity log to a decoding model, cybersecurity data, wherein the cybersecurity data is in a second format, and wherein applying the cybersecurity log to the decoding model comprises performing a patterns field technique of the cybersecurity log;

generating, based at least in part by applying the cybersecurity data to a cybersecurity threat rules model, a cybersecurity threat assessment of the cybersecurity log, wherein the cybersecurity threat rules model is configured to at least identify whether the cybersecurity log is indicative of a storage medium being rejected by the computing device or being connected to the computing device; and causing a cybersecurity threat interface to be displayed, wherein the cybersecurity threat interface is based at least in part on the cybersecurity threat assessment, wherein the cybersecurity threat interface comprises a source component and a characteristics identification component.

* * * * *